US011112046B2

(12) United States Patent
Caudell

(10) Patent No.: US 11,112,046 B2
(45) Date of Patent: Sep. 7, 2021

(54) SAFETY SYSTEM FOR CAM LOCK COUPLINGS

(71) Applicant: Jeff Caudell, Morristown, IN (US)

(72) Inventor: Jeff Caudell, Morristown, IN (US)

(*) Notice: Subject to any disclaimer, the term of this patent is extended or adjusted under 35 U.S.C. 154(b) by 185 days.

(21) Appl. No.: 16/523,713

(22) Filed: Jul. 26, 2019

(65) Prior Publication Data

US 2020/0032940 A1 Jan. 30, 2020

Related U.S. Application Data

(60) Provisional application No. 62/711,009, filed on Jul. 27, 2018.

(51) Int. Cl.
*F16L 37/18* (2006.01)
*F16L 55/115* (2006.01)

(52) U.S. Cl.
CPC ........... *F16L 37/18* (2013.01); *F16L 55/1157* (2013.01); *F16L 2201/20* (2013.01)

(58) Field of Classification Search
CPC ....... F16L 37/18; F16L 37/20; F16L 37/0841; F16L 37/142; F16L 37/086; F16L 37/14; F16L 37/146; F16L 37/22; F16L 55/1157; F16L 2201/20
See application file for complete search history.

(56) References Cited

U.S. PATENT DOCUMENTS

| | | | | |
|---|---|---|---|---|
| 1,098,265 A * | 5/1914 | James | ................ | F16L 37/0841 285/317 |
| 1,408,993 A * | 3/1922 | Eberhardt | ............... | F16B 21/16 403/355 |
| 2,518,026 A * | 8/1950 | Krapp | ..................... | F16L 37/18 285/312 |
| 2,757,944 A * | 8/1956 | Krapp | ..................... | F16L 37/18 285/129.1 |

(Continued)

FOREIGN PATENT DOCUMENTS

GB    2211258 A    6/1989

OTHER PUBLICATIONS

Disconnect fittings for low-pressure liquid & dry transfer applications at Basic Standard Cam & Groove Couplings on PT Coupling Co.

(Continued)

*Primary Examiner* — Matthew Troutman
*Assistant Examiner* — James A Linford
(74) *Attorney, Agent, or Firm* — Overhauser Law Offices, LLC

(57) ABSTRACT

A female coupling component for a cam and groove coupling, consisting of a chamber mounted to or built into the exterior of the female coupling component, containing a latching member to be used as a safety lock when used in conjunction with a male coupling component. The latching member will interlock with a radial groove on a male (Continued)

coupling component. To unlock the female coupling component, an intentional movement including pushing, twisting, and/or pulling, etc. of the latching member is applied such a way as to allow the male component to be inserted or removed. The female cam and groove coupling will work on any like-sized male coupling component (i.e., 3" female to 3" male) without any modifications necessary to the male coupling required.

6 Claims, 5 Drawing Sheets

(56) References Cited

U.S. PATENT DOCUMENTS

| | | | |
|---|---|---|---|
| 4,185,935 A * | 1/1980 | Bierlein | F16B 21/16 403/14 |
| 5,042,850 A | 8/1991 | Culler | |
| 5,944,362 A | 8/1999 | Harle | |
| 6,053,540 A | 4/2000 | Meyer | |
| 6,447,016 B2 | 9/2002 | Collier | |
| 7,644,734 B2 | 1/2010 | Palmer | |
| 9,958,099 B2 | 5/2018 | Leonhardt et al. | |
| 2001/0045745 A1 * | 11/2001 | Collier | F16L 37/18 285/81 |
| 2003/0151252 A1 * | 8/2003 | Dole | F16L 37/18 285/312 |
| 2011/0155735 A1 | 6/2011 | DeMent | |

OTHER PUBLICATIONS

Dixon Cam & Groove Couplings and Accessories.
STA LOK® Cam & Groove on PT Coupling Co, Disconnect fittings for low-pressure liquid & dry transfer applications.
STA LOK® II Passive Locking Cam & Groove on PT Coupling Co.
Kuriyama of American Inc. Tri-Couple. Edition 0318. Three-in-One Coupling Station.

* cited by examiner

SAFETY SYSTEM FOR CAM LOCK COUPLINGS

CROSS REFERENCE TO RELATED APPLICATIONS

This application claims the benefit of U.S. Provisional Application 62/711,009 filed 27 Jul. 2018.

FIELD OF THE INVENTION

The present invention relates to quick disconnect couplings which use a pair of latching levers to open and close the coupling by a camming action, and more particularly, to a safety locking system for a cam and groove-type quick disconnect coupling.

BACKGROUND

This invention relates to quick disconnect couplings. Many of these types of quick disconnect couplings in the prior art include elongated latching handles which are mounted externally on a female socket element with a cam head or a cam structure on each handle which projects through an opening in the socket, and functions to engage a groove formed in a male adapter element, and bias the male adapter into an interfitting, telescoped sealing relationship to the socket when the latch handles are pivoted to the latching position. The coupling can then be quickly released by pivoting the handles in the opposite direction so that the adapter can be removed from the socket. Several patents of the type described are U.S. Pat. No. 3,195,934 to Parrish, U.S. Pat. No. 2,641,490 to Krapp and U.S. Pat. No. 2,479,586 to Krapp and U.S. Pat. No. 2,770,474.

A safety hazard often exists in the use of certain quick disconnect couplings employed for connecting the opposed ends of two lines for the purpose of conveying a fluid (or gas) under high pressure from one point to another via the coupling. This hazard exists at the time that the coupling is unlatched, and the high-pressure fluid (or gas) is enabled to escape between the adapter and the socket, thereby creating a serious hazard to persons who may be standing adjacent the coupling at that time. Some devices have heretofore been proposed for assuring that the coupling will not decouple when the latching handles are pivoted, without some warning to persons nearby or some safety feature which will prevent total uncoupling, but rather will allow the high pressure fluid (or gas) to bleed in a controlled fashion through the cracked coupling before complete disconnection occurs.

One of the types of quick disconnect couplings which includes a pin which prevents the coupling from being decoupled by pivotation of the coupling handles, and thus affords a safety feature against the release of high pressure fluid, is depicted in the "BOSS-LOCK" brochure of the Dixon Valve and Coupling Company, and is shown in U.S. Pat. No. 4,295,670. Also known is the Dixon Vent Lock Safety Cain and Groove, which requires that the female coupling be rotated until its safety mechanism lines up with the release slots in the male coupling component. However, this system requires a special male coupling having release slots.

Another type of quick disconnect coupling which includes a safety pin is that which is illustrated in U.S. Pat. No. 4,871,195.

Some devices have heretofore been proposed for assuring that the coupling will not decouple when the latching handles are pivoted without some warning to persons nearby, or some safety feature which will prevent total uncoupling and allow the high pressure fluid or gas to bleed in a controlled fashion through the cracked coupling before complete disconnection occurs.

SUMMARY OF THE INVENTION

The present invention provides a cam and groove-type quick disconnect coupling which, as a result of the inclusion of a safety latching member in the coupling assembly, cannot be totally disconnected, or even disconnected to an extent such that a rapid escape of high pressure fluid or gas occurs so as to endanger those who may be standing near the coupling at the time the fluid or gas escape occurs. The safety latching member must be purposefully moved (pushed, pulled, twisted, etc.) in order to separate the coupling halves. The safety latching member may not require any purposeful movement for engagement of the coupling halves but must require a purposeful movement by the operator for disengagement. The addition of the safety latching member will prevent forcible ejection of hoses, caps, etc. and prevent spills of dangerous materials.

Broadly described, the cam and groove-type quick disconnect coupling includes the conventional female socket and male adapter elements which are coupled by means of conventional latching handles carried on the socket. The latching handles have cam surfaces which extend through openings in the socket and act upon an arcuate surface carried on the adapter within the socket. This causes the male adapter to be biased into a sealed status in the female socket.

In one embodiment, in addition to the conventional latching handles, the socket contains a tangential latching member which is contained within a chamber on the outside of the female socket where the male part interacts with the female socket. The chamber has a closed end, an open end, and an opening that is mounted in such a way that the female socket has an opening into the chamber. In one embodiment, a spring is set in the closed end of the chamber. There is a latching member with two grooves, each on opposing sides that line up with the female socket opening in the chamber. The outer groove is fitted with a set screw so as to not allow the piston to fall out of the chamber or rotate. The anti-rotation pin/set screw could be replaced by some other means of preventing rotation of the latching member. The inner groove, when the latching member is biased towards the spring, unlocks the male coupling from the female socket. When the latching member is in its latched position, it locks the male coupling to the female socket even when the latching handles are in their unlocked position.

One object of the invention is to provide an improved safety feature for use on a quick disconnect coupling of the type which includes a pair of pivoted latching handles (cam and groove couplings) which function to couple and decouple the coupling as it is used.

A further object of the invention is to provide a safety latching member in a quick disconnect coupling which the latching member functions as a safety feature to loosely interconnect the male and female halves of the coupling at a time when the regular latching handles are pivoted to a coupling release position. The safety latching member is wholly contained in the female half of the coupling and will work on any standard male coupling without modification. This is accomplished by the safety latching member protruding into the circumferential groove of a standard male coupling.

Additional objects and advantages of the invention will become apparent as the following detailed description of the invention is read in conjunction with the accompanying drawings which illustrate a preferred embodiment of the invention.

DETAILED DESCRIPTION

The present invention is further illustrated with the following detail, which generally may be taken in conjunction with the drawings and is not to be construed as limiting in nature.

In general, the embodiments of the present invention provide a safety latching member attached tangentially to, included within the casing of, or otherwise affixed to the female coupling component for a cam and groove coupling. A general cam and groove coupling is assembled by inserting the male coupling component into the female coupling component. The cam arms found on the female coupling component are then pivoted so they engage the grooves in the male coupling component to lock the male coupling component within the female coupling component.

Figure 1:
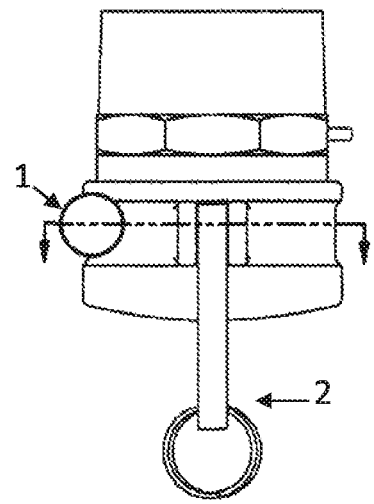
FIG. 1 shows a side view of a female coupling component where the cam arms are in a locked position and in which the closed end of the chamber is shown. It will be understood that the cam arms could easily be configured so that the arms extend in the opposite position when in their locked position.

FIGS. 1-6 and 9 present embodiments of the female coupling component with a safety latching mechanism of the present invention. One embodiment pertains to a female coupling component with a latching member 3 enclosed in a chamber 1 to be used as a safety locking apparatus for a cam and groove coupling. When a male coupling component is inserted into a typical female cam and groove coupling, the only locking member is the cam arms 2 (FIG. 1). The cam arms 2 on the exterior of the female coupling component are pivotable from an unlocked to locked position, the locked position being shown in (FIGS. 1, 2, 3, 5, 6, and 9).

Figure 2:
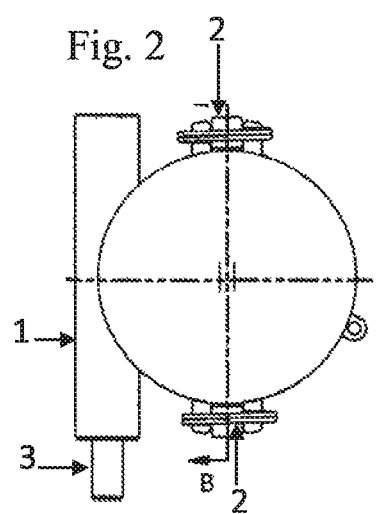
FIG. 2 shows a bird's eye view of the female coupling component where the cam arms are in the unlocked position and the latching member is in the latched position within the chamber.
Figure 3:
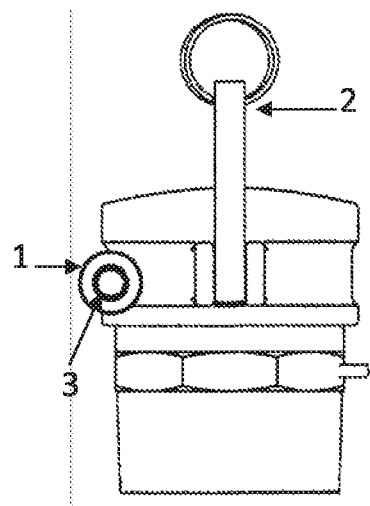
FIG. 3 shows a side view of the female coupling component in which the cam arms are unlocked, and the exposed latching member is in the latched position within the chamber.
Figure 4:
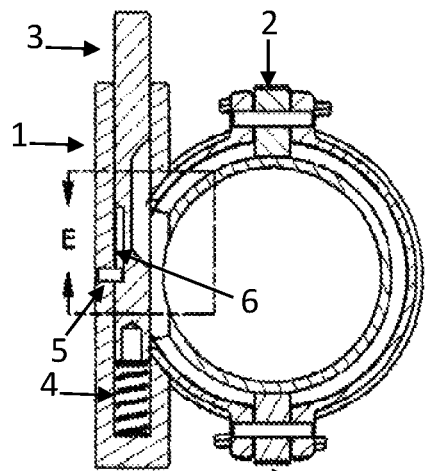
FIG. 4 is a sectional side view of the female coupling component in which the spring, latching member, recess in the latching member, and set screw are all shown within the chamber in the latched position and the cam arms are in the locked position.
Figure 5:
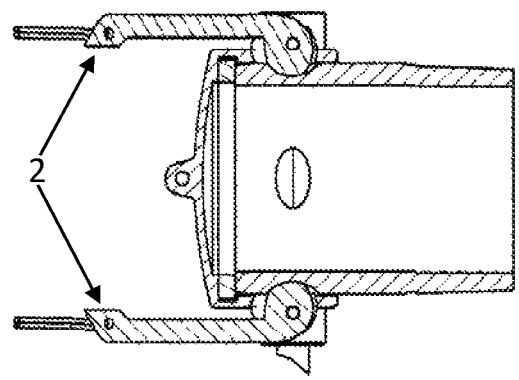
FIG. 5 shows a side view of the female coupling component with the cam arms in the locked position.

FIGS. 1-3 illustrate a female coupling component having a cylindrical outer surface wherein the cam arms 2 are in an unlocked position. The closed end of the chamber 1 is shown in (FIG. 1), whereas the open end of the chamber 1 with the latching member 3 inside is shown in (FIG. 3). FIG. 2 illustrates the bird's eye view of the female coupling component with the latching member 3 being shown protruding from the chamber 1. It is to be understood the orientation of the chamber and the direction in which the latching member protrudes may be reoriented and/or reversed from that in (FIGS. 1,2,3,4,5,6, and 9). Latching member 3 is within the chamber 1 which may be built into or affixed to the side of the female coupling component intermediate at least two cam arms 2. FIGS. 2, 4, and 5. Latching member 3 is partially located outside the cylindrical outer surface of the female coupling component. FIGS. 2, 4, 9, and 12.

Figure 7:
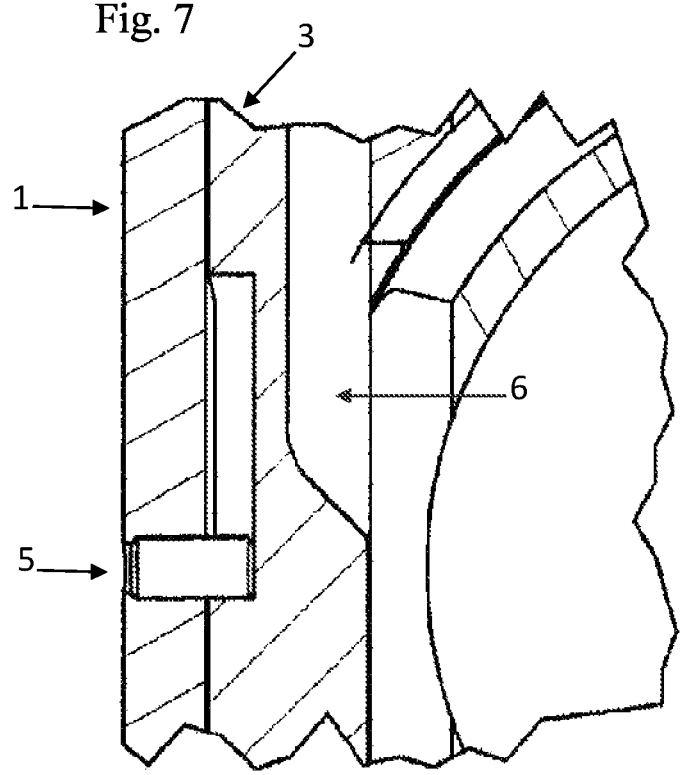
FIG. 7 is a partial sectional view of the female coupling component with the tangential latching member contained within the chamber in the latched position.

FIG. 4 illustrates a sectional side view of one embodiment of the present invention with a spring biased latching mechanism. The latching member 3 is shown in the locked position within the chamber 1 with a set screw 5, wherein the recess of the latching member 6 does not allow the male coupling component to be released from the female coupling component without a purposeful movement. The latching member 3 may be held in place by the set screw 5, as shown in (FIG. 4), or may be held by any other means of restraint. FIG. 7 illustrates in a magnified view Section E of FIG. 4 that includes the inner recess of the latching member 6, the latching member 3, and the set screw 5 held within the chamber 1. The inner recess of the latching member 6 allows the male coupling component to be inserted or removed. In order to move the latching member 3 to the unlatched position in this embodiment, an intentional force must be applied to move the latching member 3 so that no part of the latching member is within the radial groove of the male coupling. This may be done by biasing the latching member 3 against the spring 4, which is held within the closed end of the chamber 1.

Figure 6:
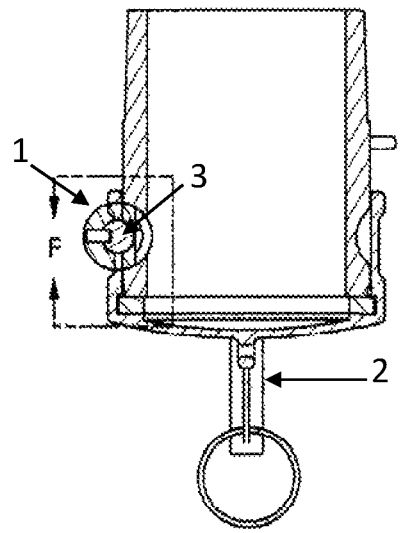
FIG. 6 shows a sectional side view of the female coupling component with the cam arms in the locked position and the set screw within the latching member and chamber.
Figure 8:
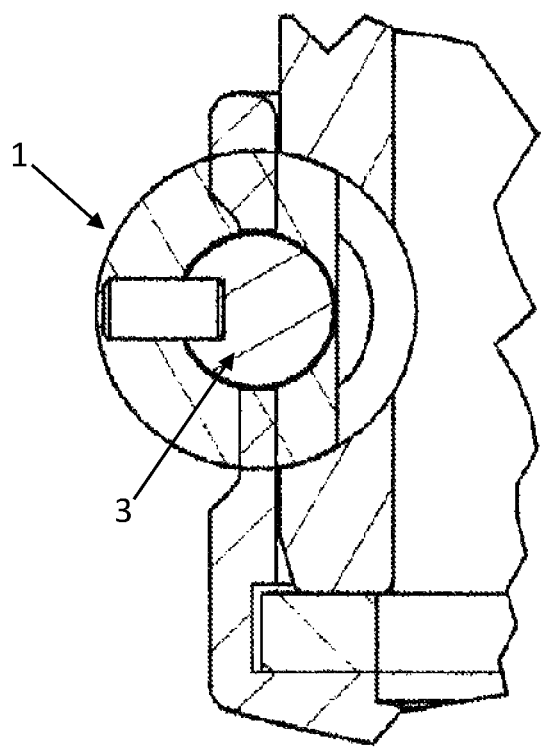
FIG. 8 is a partial sectional view of the female coupling component with the latching member contained within the chamber.

FIG. 5 illustrates a side view of the female coupling component with the cam arms 2 in the locked position. FIG. 6 is a sectional side view of the female coupling component with the cam arms 2 in the locked position. FIG. 5 further illustrates the latching member 3 within the chamber 1, held in place with the set screw 5. FIG. 8 shows a section of FIG. 5, including the cross view of the latching member 3 within the chamber 1, held in place with the set screw 5 in a magnified view.

Figure 9:
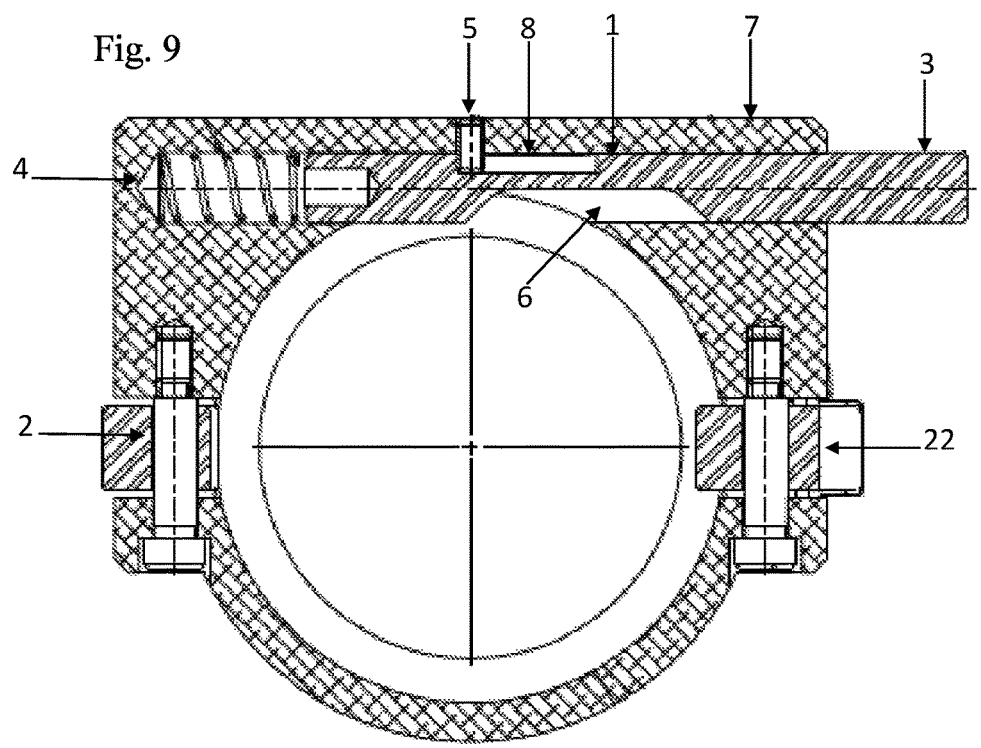
FIG. 9 is an aerial view of one embodiment of the invention wherein the latching member is enclosed within a case including the female coupling component rather than attached tangentially to the female coupling component.

FIG. 9 illustrates a second embodiment of the present invention in which the chamber 1 is fully enclosed within a case 7 including the female coupling component as opposed to being attached tangentially to the female coupling component as shown in (FIGS. 1, 2, 3, 4, and 6.) This embodiment is shown with one cam arm 2 in the unlocked position the other cam arm 22 in the locked position (extending into the area of the recessed groove), and the latching member 3 in the latched position with the spring 4 in its neutral position. The inner recess of the latching member 6 is working in conjunction with the radial groove of the male coupling component to hold the latching member 3 in the latched position. The set screw 5 is held within the set screw recess 8 which allows the latching member 3 to be pushed against the spring 4 and to easily return to its neutral position.

Figure 10:
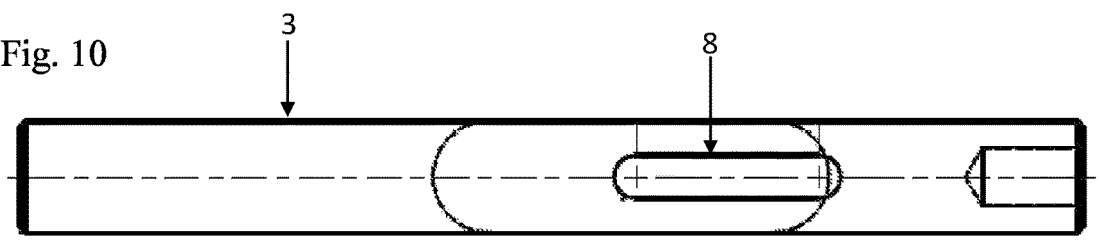
FIG. 10 is an aerial view of the latching member, not contained within the chamber, showing the recess for the set screw.
Figure 11:
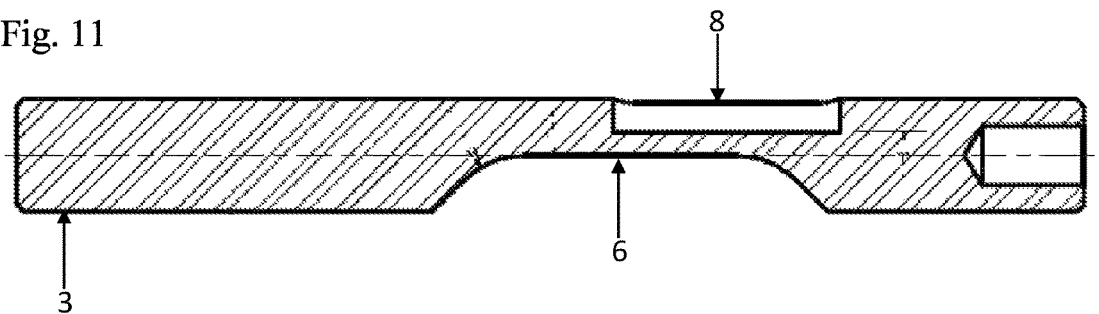
FIG. 11 is a side view of the latching member, not contained within the chamber, showing the recess for the set screw and the inner recess which interacts with the radial groove of the male coupling component.

FIGS. 10 and 11 illustrate the latching member 3 when it is not enclosed within the chamber 1. FIG. 10 shows a bird's eye view of the latching member 3 with the set screw recess 8. FIG. 11 shows a side view of the latching member 3 with the set screw recess 8 and the inner recess of the latching member 6.

Figure 12:
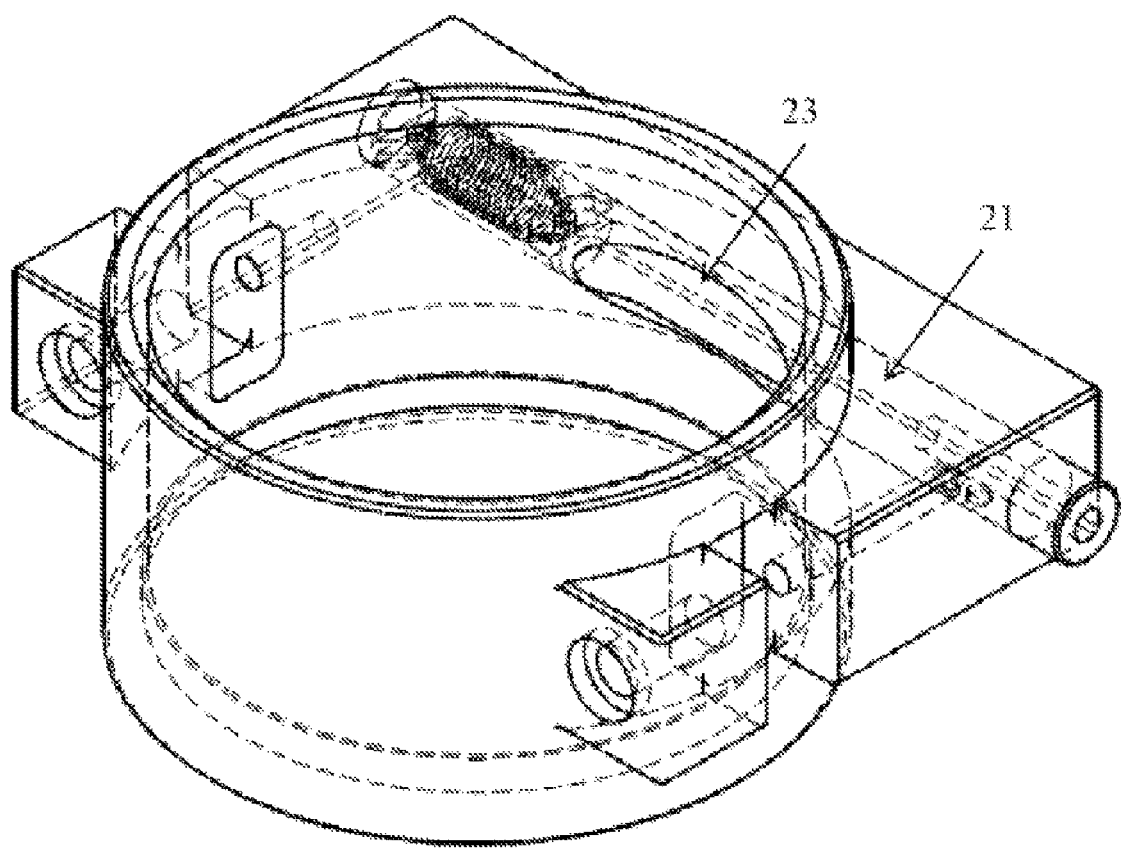
FIG. 12 is a perspective view of a coupling in which the latching member has a longitudinal axis and may be rotated or twisted about the longitudinal axis between latched and unlatched positions.

FIG. 12 is a perspective view of a coupling in which the latching member 21 has a longitudinal axis and may be rotated or twisted about the longitudinal axis between latched and unlatched positions. As shown the recess 23 is coincident with the interior of the coupling to thereby allow a male coupling member to inserted or removed therefrom.

In a further embodiment, the safety latching member is a passive locking system in which no purposeful movement other than that to connect the male and female components is needed to employ the safety latch. In this further embodiment, a purposeful movement is necessary to unlock the safety latching member. The purposeful movement may be any movement such as pushing, pulling, or twisting, among others.

It is to be understood that the singular forms "a", "an", and "the" include plural referents unless the context clearly dictates otherwise. Thus, for example, reference to "a latching member" includes reference to one or more of such latching members, i.e. that there is at least one latching member. The terms "comprising", "having", "including", and "containing" are to be construed as open-ended terms (i.e., meaning "including, but not limited to,") unless otherwise noted. All methods described herein can be performed in any suitable order unless otherwise indicated herein or otherwise clearly contradicted by text. The use of examples or exemplary language (e.g. "such as") is intended merely to better illustrate or describe embodiments of the invention and is not intended to limit the scope of the invention unless otherwise claimed.

While the invention has been illustrated and described in detail in the foregoing drawings and description, the same is to be considered as illustrative and not restrictive in character, it being understood that only illustrative embodiments thereof have been shown and described and that all changes and modifications that are within the scope of the following claims are desired to be protected.

All references cited in this specification are incorporated herein by reference to the extent that they supplement, explain, provide a background for or teach methodology or techniques employed herein.

What is claimed is:

1. A female coupling component for a cam and groove coupling joint, comprising:
   a female coupling component having a cylindrical outer surface configured for use with a male coupling component, the male coupling component having a hollow interior to convey fluid or gas, the female coupling component adapted to secure the male coupling component in close fitting engagement by a plurality of cam arms positioned on the female coupling half engaging a radial groove of the male coupling half,
   each cam arm being
      pivotally connected to the female coupling component; and
      being pivotable between
         a first unlocked position wherein the male coupling half is insertable and removable from the female coupling component and
         a second locked position wherein the male coupling half is securable in close fitting engagement with the female coupling component;
   an external case member which contains a chamber containing a latching member is partially built into or affixed to an outside circumferential surface of the female coupling component intermediate at least two cam arms and perpendicular to the axis of the female coupling component;
   the latching member is held within the chamber by a set screw inserted into the chamber perpendicular to the axis of the female coupling component;
   the latching member is partially located outside the cylindrical outer surface of the female coupling component and that is movable between a latched position wherein the latching member is positionable within the radial groove of a male coupling half within the female coupling half, and an unlatched position in which the latching member is not within the radial groove.

2. The female coupling component for a cam and groove coupling joint of claim 1, wherein the latching member must be purposefully moved using a twisting, pushing, or pulling movement.

3. The female coupling component for a cam and groove coupling joint of claim 1, wherein the latching member is normally biased toward the latched position.

4. The female coupling component for a cam and groove coupling joint of claim 3, further comprising:
   a chamber affixed or built into the female coupling component,
   a spring,
   and wherein
      the latching member is at least partially within the chamber and includes a recess, and
      the spring biases the latching member toward the latched position.

5. The female coupling component for a cam and groove coupling joint of claim 4, wherein the latching member is slideable within the chamber and partially extends from the chamber, includes a motion limiting groove, and wherein the chamber houses a setscrew, pin or other means extendable into the motion limiting groove of the latching member to prevent the latching member from being removed from the chamber.

6. The female coupling component for a cam and groove coupling joint of claim 1, wherein the latching member has a longitudinal axis and is rotatable about the longitudinal axis between latched and unlatched positions.

* * * * *